Oct. 20, 1942.                J. B. SUOMALA                 2,299,358
                         SOUND REPRODUCING APPARATUS
                            Filed Jan. 31, 1940
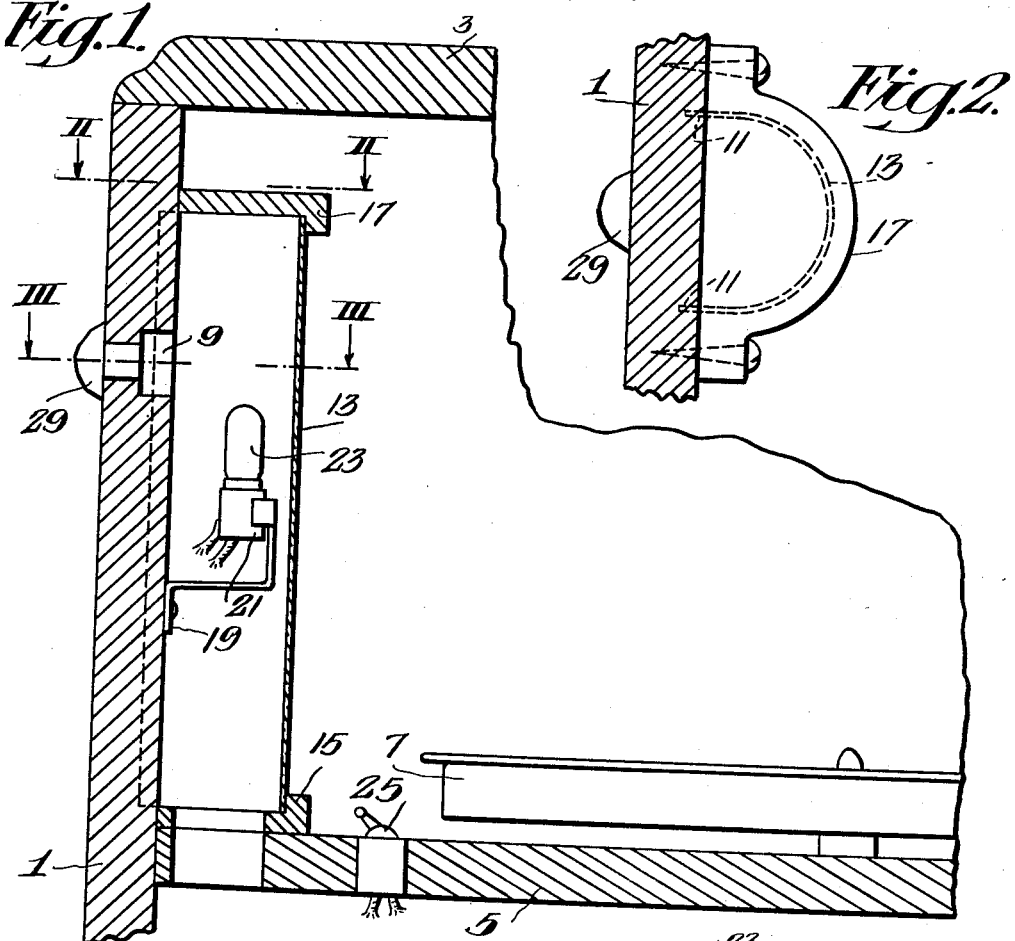
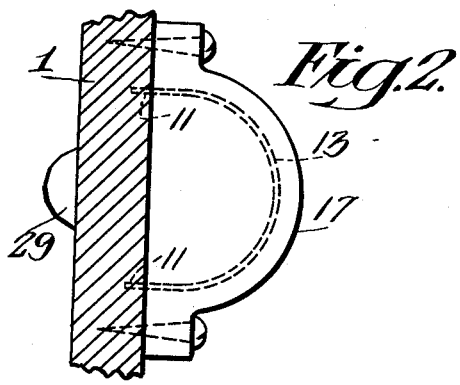
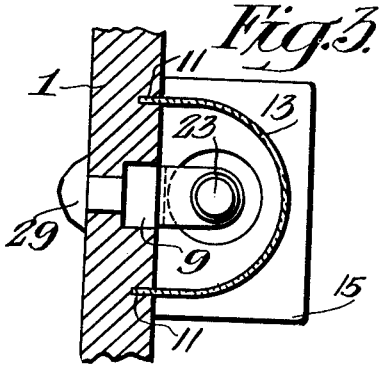
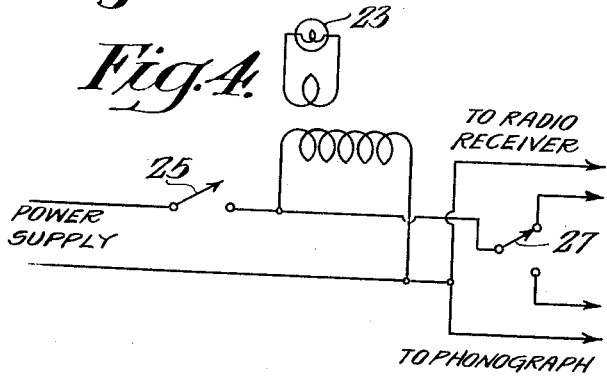
Inventor
John B. Suomala
By
J. J. Fuff
Attorney Patented Oct. 20, 1942

2,299,358

UNITED STATES PATENT OFFICE 2,299,358

SOUND REPRODUCING APPARATUS

John B. Suomala, Haddonfield, N. J., assignor to Radio Corporation of America, a corporation of Delaware Application January 31, 1940, Serial No. 316,618

2 Claims. (Cl. 177—311)

This invention relates to sound reproducing apparatus, and more particularly to means for indicating the operating condition of such apparatus.

In sound reproducing apparatus, such as radio receivers, phonographs, or the like, of the type wherein the reproducing devices are wholly enclosed within a cabinet and of which no part is visible from the outside of the cabinet, it occasionally happens that the operator forgets to shut off the power supply thereto after reproduction has ceased, thereby needlessly consuming power. The primary object of my present invention is to provide improved indicating means visible from the exterior of the cabinet of such apparatus by means of which it can be readily ascertained whether the instrument is turned on or off.

More particularly, it is an object of my present invention to provide improved indicating means which will reveal, at a glance, the operating condition of the apparatus.

Another object of my present invention is to provide an improved compartment light for the cabinet which, at the same time, may also be utilized as a pilot light.

It is an object of my present invention to provide an improved compartment and indicator or pilot light in instruments of the type above set forth which is simple in construction, economical in cost, and highly efficient in use.

In accordance with my invention, I provide a light in that compartment of the cabinet wherein the controls for the various reproducing instrumentalities are mounted and arrange this light preferably immediately behind the front wall of the cabinet, placing a suitable screen around said light to diffuse the rays therefrom. In the front wall of the cabinet, I form a small opening through which light rays from said light may pass and mount a transparent crystal or jewel in said opening at the front surface of said wall, the crystal being adapted to transmit the light in various directions. The light is connected in parallel with the sound reproducing apparatus across the power line circuit and energy to both said light and said sound reproducing apparatus is controlled through a master switch. Thus, when the switch is turned to "on" position, the sound reproducing apparatus is energized and simultaneously the light is turned on to illuminate the contents of the compartment wherein it is located and thus facilitate viewing the contents thereof.

At the same time, the light rays from said light source which are transmitted through the crystal at the front of the cabinet serve as a visible indication to the user that the apparatus is turned on. If, therefore, the crystal or jewel is illuminated but no sound is emitted by the reproducing apparatus, it is at once apparent that power is being needlessly supplied to the apparatus, and appropriate action may thereupon be taken.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawing, in which:

Figure 1 is a central sectional view of a portion of a sound reproducing device in accordance with my invention, Figure 2 is a sectional view taken on the line II—II of Fig. 1, Figure 3 is a sectional view taken on the line III—III of Fig. 1, and Figure 4 is a wiring diagram showing one circuit arrangement including my invention.

Referring more particularly to the drawing, wherein similar reference numerals indicate corresponding parts throughout, there is shown, in Fig. 1, a cabinet having a front wall 1, a hinged lid 3 and a motor board or the like 5, all of which in combination with the remaining walls of the cabinet form a compartment in which may be housed a phonograph, as represented by the turntable 7, and the control knobs or the like of a radio receiver (not shown). The front wall 1 is provided with an opening 9 and a pair of longitudinally extending slots 11, a preferably translucent screen 13 being mounted behind the opening 9 and having its edges received within the slots 11. The screen 13, which may be of Celluloid or the like, is preferably bent into U shape and is held in place by a base member 15 and a cap member 17.

Within the space enclosed by the screen 13 and the members 15 and 17, there is mounted on the wall 1 a bracket 19 which carries a socket 21 for a suitable lamp 23, the bracket 19 being mounted in such a position on the front wall 1 of the cabinet that light rays from the lamp 23 will pass through the opening 9 and will be visible from outside of the cabinet. The lamp 23 is preferably connected in shunt with the phonograph and the radio receiver across a power supply circuit, as clearly shown in Fig. 4, and the circuit may be controlled by a master switch 25. Where both a radio receiver and a phonograph are included in the apparatus, either one or the other of these units may be selected for reproduction by a secondary switch 27 in well known manner. In any event, regardless of whether the radio receiver or the phonograph is connected to the power supply through the switch 27, it is obvious that, when the master switch 25 is closed, the light source 23 will be energized and the light rays therefrom passing through the opening 9 in the front wall of the cabinet will indicate that the apparatus has been turned on. A transparent crystal or jewel 29 may be placed on the front wall of the cabinet within the opening 9 to receive and transmit the light rays from the lamp 23 to the exterior of the cabinet and direct it in a plurality of directions so that one need not stand immediately in front of the opening 9 to ascertain whether the light source 23 is energized or not. It will also be obvious that the light diffused by the screen 13 will serve to illuminate the contents of the compartment in which the turntable 7 is mounted and thereby facilitate viewing the contents of this compartment and the manipulation of the pickup device and/or other control devices.

From the foregoing description, it will be apparent to those skilled in the art that I have provided a novel and simple means for both illuminating the compartment within which certain operating members or control members of suitable sound reproducing apparatus may be mounted and at the same time providing a visible indication of the operating condition of said apparatus. Although I have shown but one specific embodiment of my invention, I am aware that many other modifications are possible, and therefore I do not wish to be limited except insofar as is made necessary by the prior art and by the spirit of the appended claims.

I claim as my invention:

1. In combination, a cabinet including a plurality of walls and a cover movable to and from open and closed positions with respect to said walls, sound reproducing apparatus including a control device therefor all wholly enclosed within said cabinet and hence not visible from the exterior of the cabinet when said cover is in closed position, and a light source in said cabinet for illuminating at least a portion of the interior thereof to facilitate viewing the contents therein when said cover is in open position, said cabinet having an opening in one of the walls thereof and said light source being so located with respect to said opening that light rays emitted thereby are constantly visible through said opening from the exterior of said cabinet.

2. In combination, a cabinet including a plurality of walls and a cover movable to and from open and closed positions with respect to said walls, sound reproducing apparatus including a control device therefor and an electrically operable device all wholly enclosed within said cabinet and hence not visible from the exterior of said cabinet when said cover is in closed position, a light source in said cabinet for illuminating at least a portion of the interior of said cabinet to facilitate viewing the contents therein when said cover is in open position, said light source being in circuit with said device, and switch means operable to control said circuit and adapted to energize both said device and said light source when closing said circuit, said cabinet having an opening in one of the walls thereof, and said light source being so located with respect to said opening that light rays emitted thereby are constantly visible through said opening from the exterior of said cabinet whereby to give a visible indication of the operating condition of said apparatus.

JOHN B. SUOMALA.